(12) United States Patent
Peterson et al.

(10) Patent No.: US 6,487,780 B1
(45) Date of Patent: Dec. 3, 2002

(54) ROTARY DEVICE FOR AUTOMATICALLY DEPLOYING AND RETRACTING A CORD-LIKE ELEMENT FROM A STORAGE DEVICE

(75) Inventors: Dennis R. Peterson; Joseph A. Peterson, both of Austin, TX (US)

(73) Assignee: Peterson Science & Technology, Inc., Austin, TX (US)

( * ) Notice: Subject to any disclaimer, the term of this patent is extended or adjusted under 35 U.S.C. 154(b) by 0 days.

(21) Appl. No.: 09/565,849

(22) Filed: May 5, 2000

Related U.S. Application Data
(60) Provisional application No. 60/133,090, filed on May 7, 1999.

(51) Int. Cl.[7] ............................................... A01D 34/84
(52) U.S. Cl. .......................................... 30/347; 30/276
(58) Field of Search ..................... 30/276, 347; 56/12.7

(56) References Cited

U.S. PATENT DOCUMENTS

| 4,569,134 A | 2/1986 | Kobayashi |
| 5,675,897 A | 10/1997 | Berfield |
| 5,743,019 A | 4/1998 | Berfield |

OTHER PUBLICATIONS

"Easy Trimmer", Apr. 13, 2000, Popular Science–May, 2000, p. 34.
Dennis Roger Peterson, Aug., 1978, Design and Testing of A Supersonic Filament Pump, Masters Thesis, University of Wyoming.

*Primary Examiner*—Douglas D. Watts
(74) *Attorney, Agent, or Firm*—Jack V. Musgrove

(57) ABSTRACT

A rotary device for automatically dispensing and retracting a line, such as cutting filament for a vegetation trimmer, has a spool around which is wound a small coil of the line. The line has a cutting segment that extends radially from the spool. The cutting segment has a precise length that is automatically maintained by a balance of centrifugal force and aerodynamic drag. The rotary device also has additional storage capacity for the line. An additional supply of line for the rotary device beyond the small coil may be stored in many different forms while remaining ready for immediate deployment and use. Examples include extended storage loops of the line protruding from the spool, a second coil or reservoir of line located remotely from the spool, or a magazine of the line mounted to the spool.

2 Claims, 16 Drawing Sheets

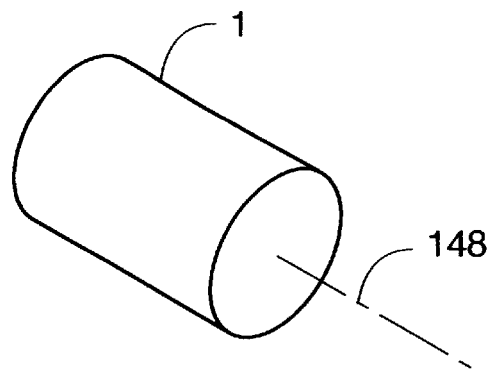
Fig 1-A
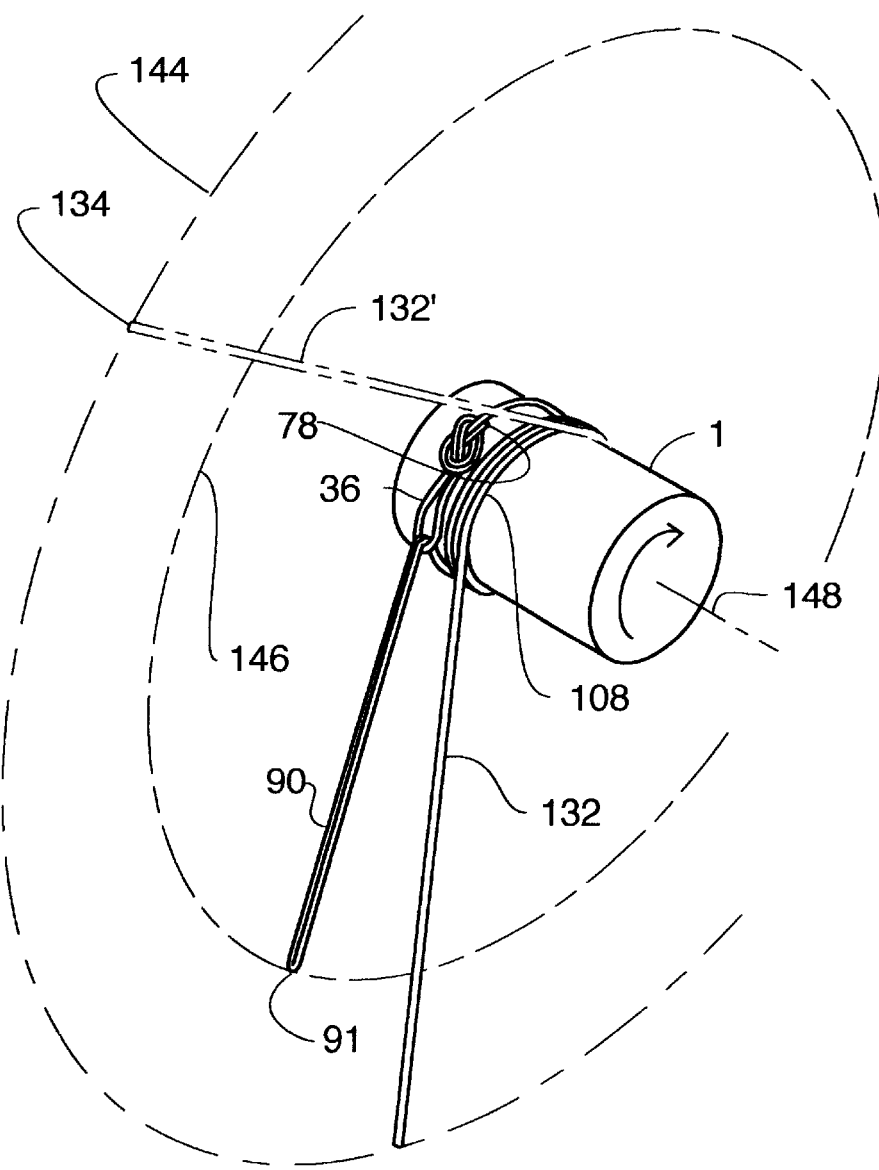
Fig 1-B

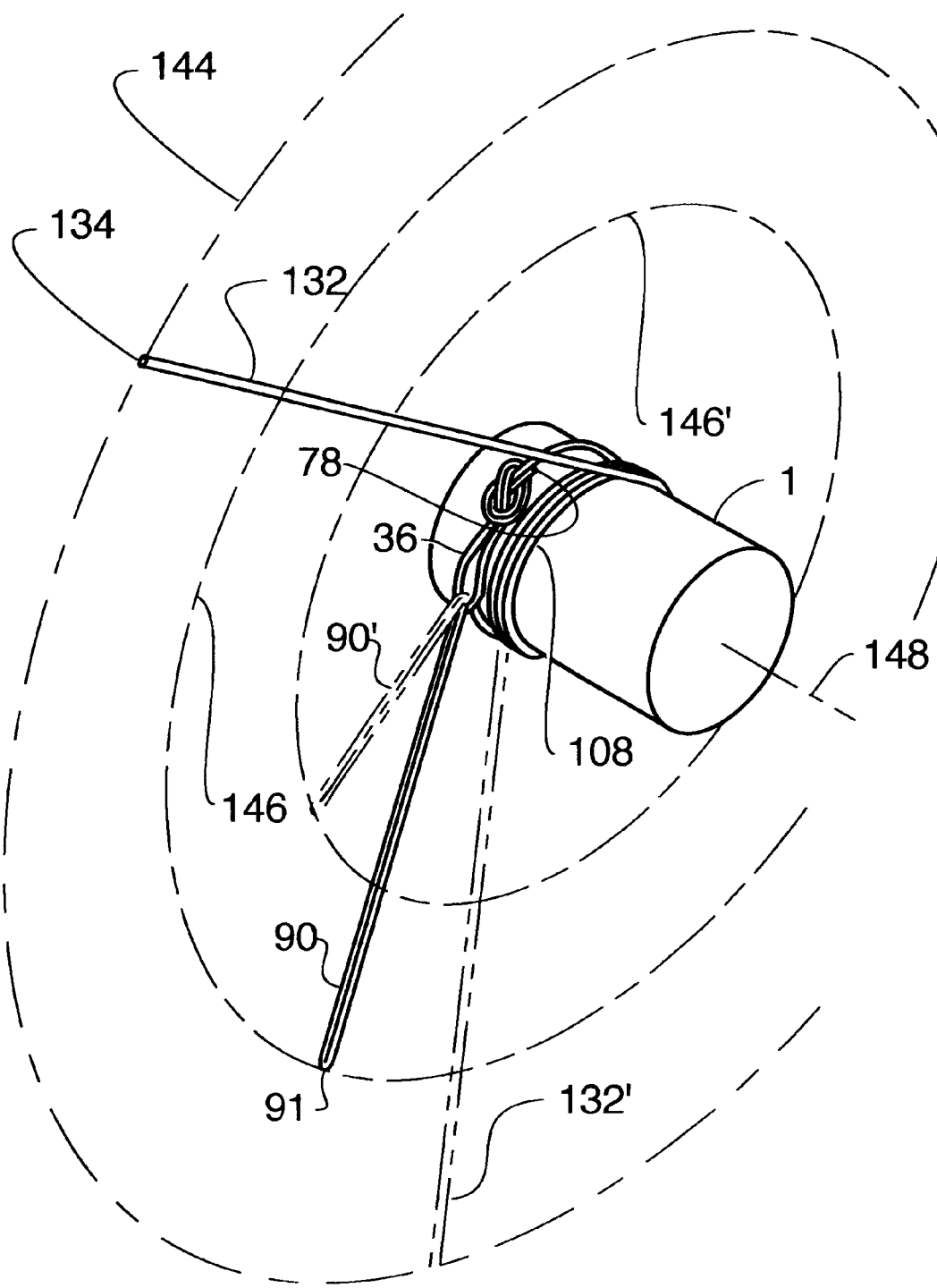
Fig 1-C

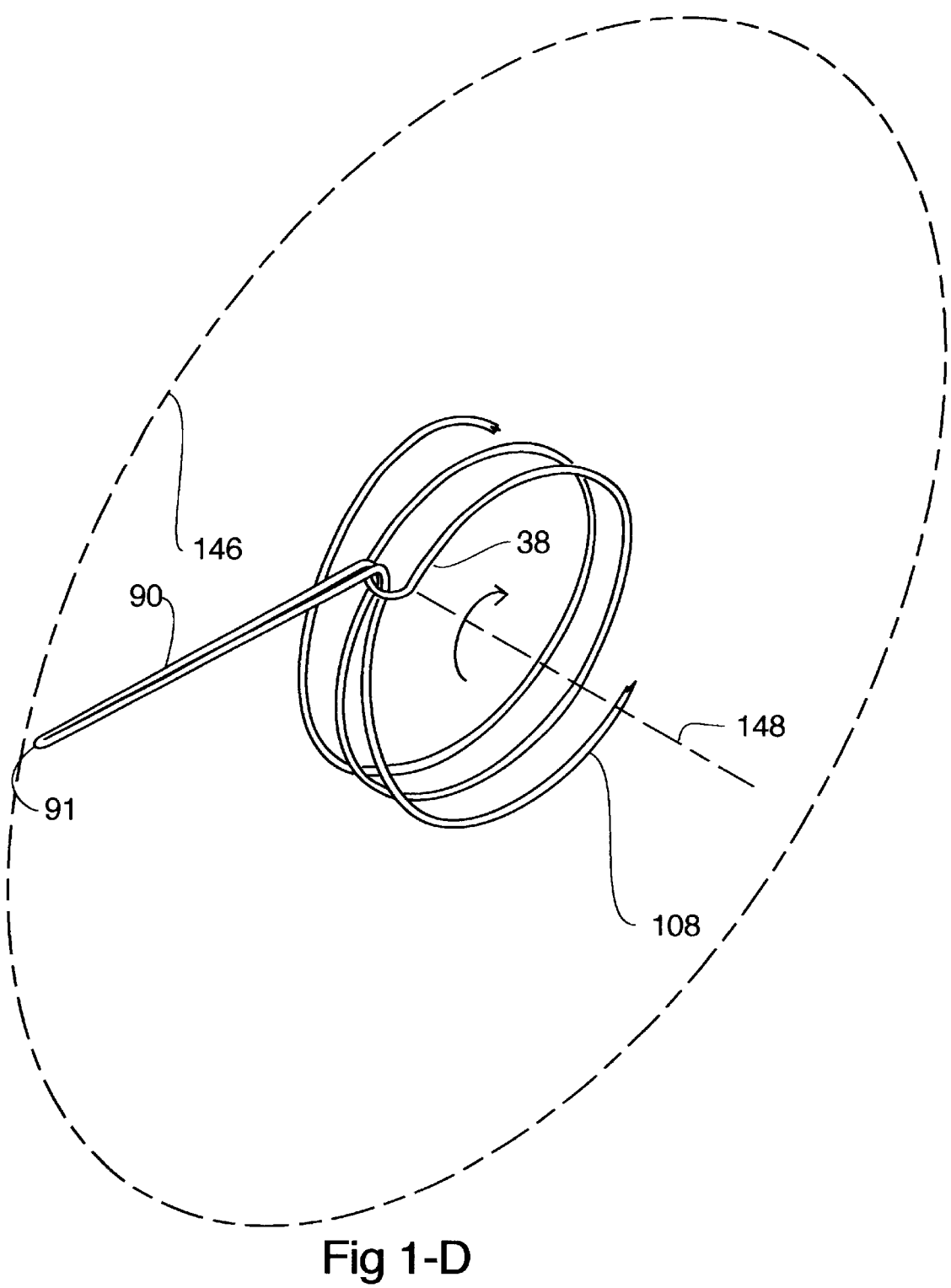
Fig 1-D

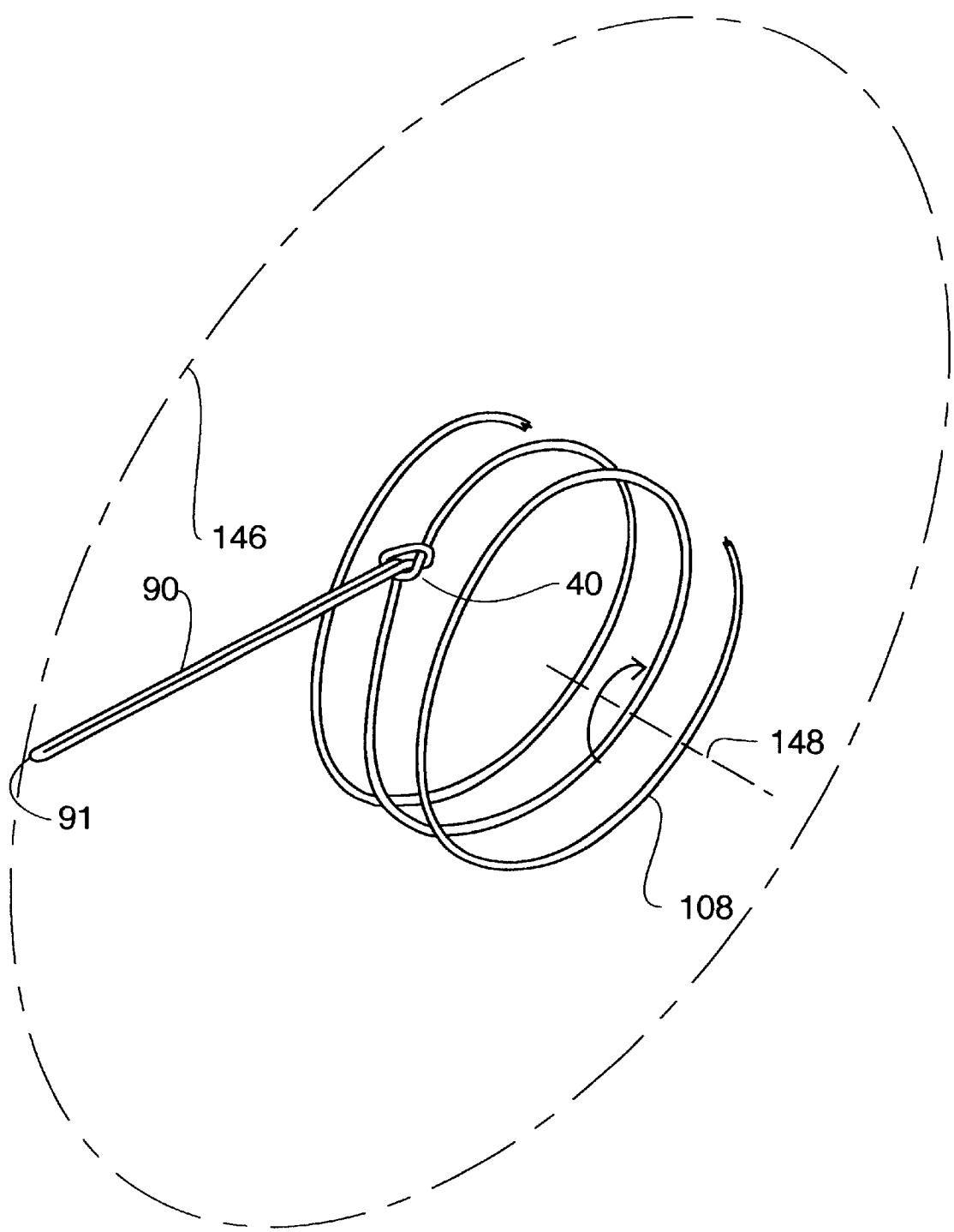
Fig 1-E

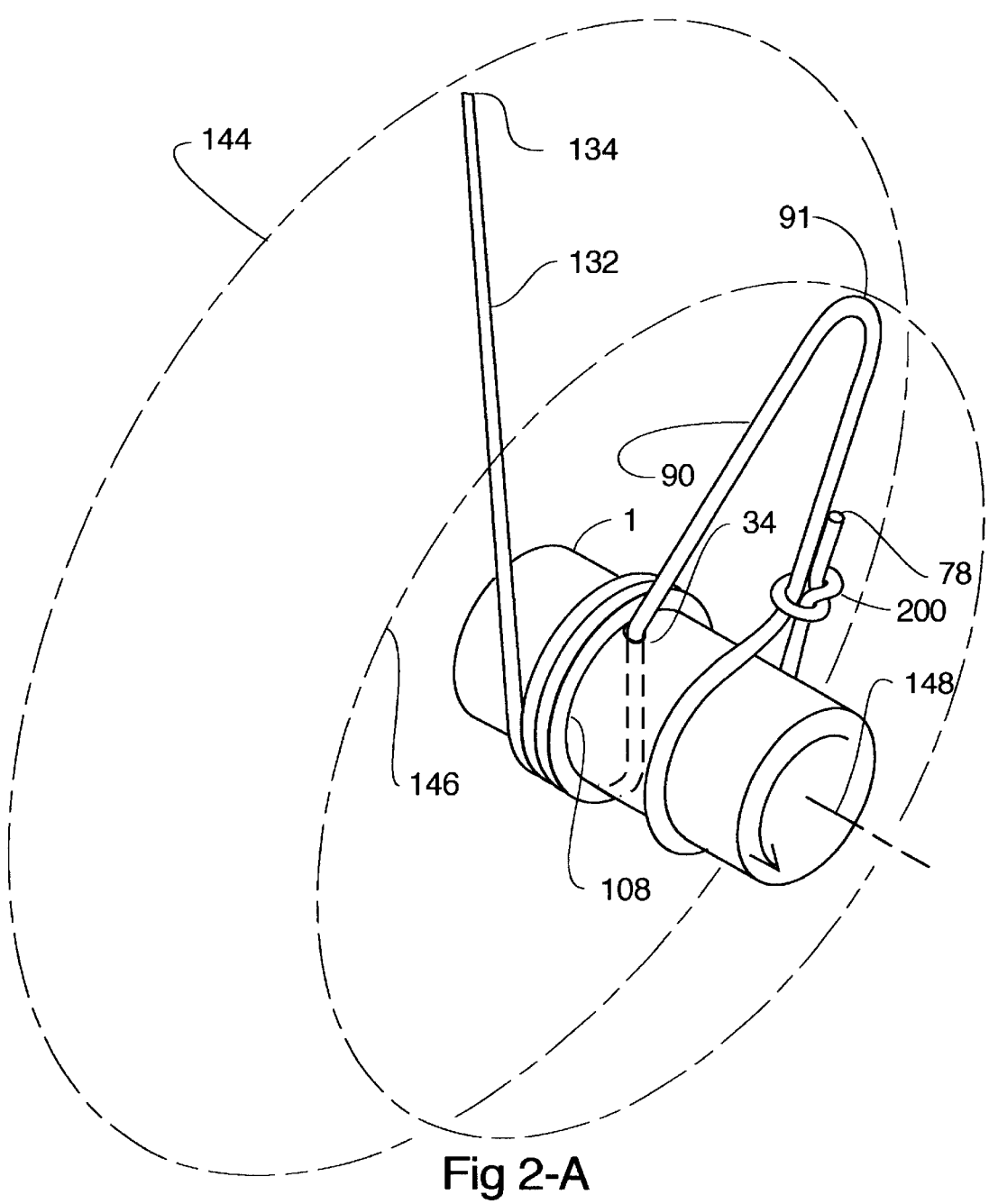
Fig 2-A

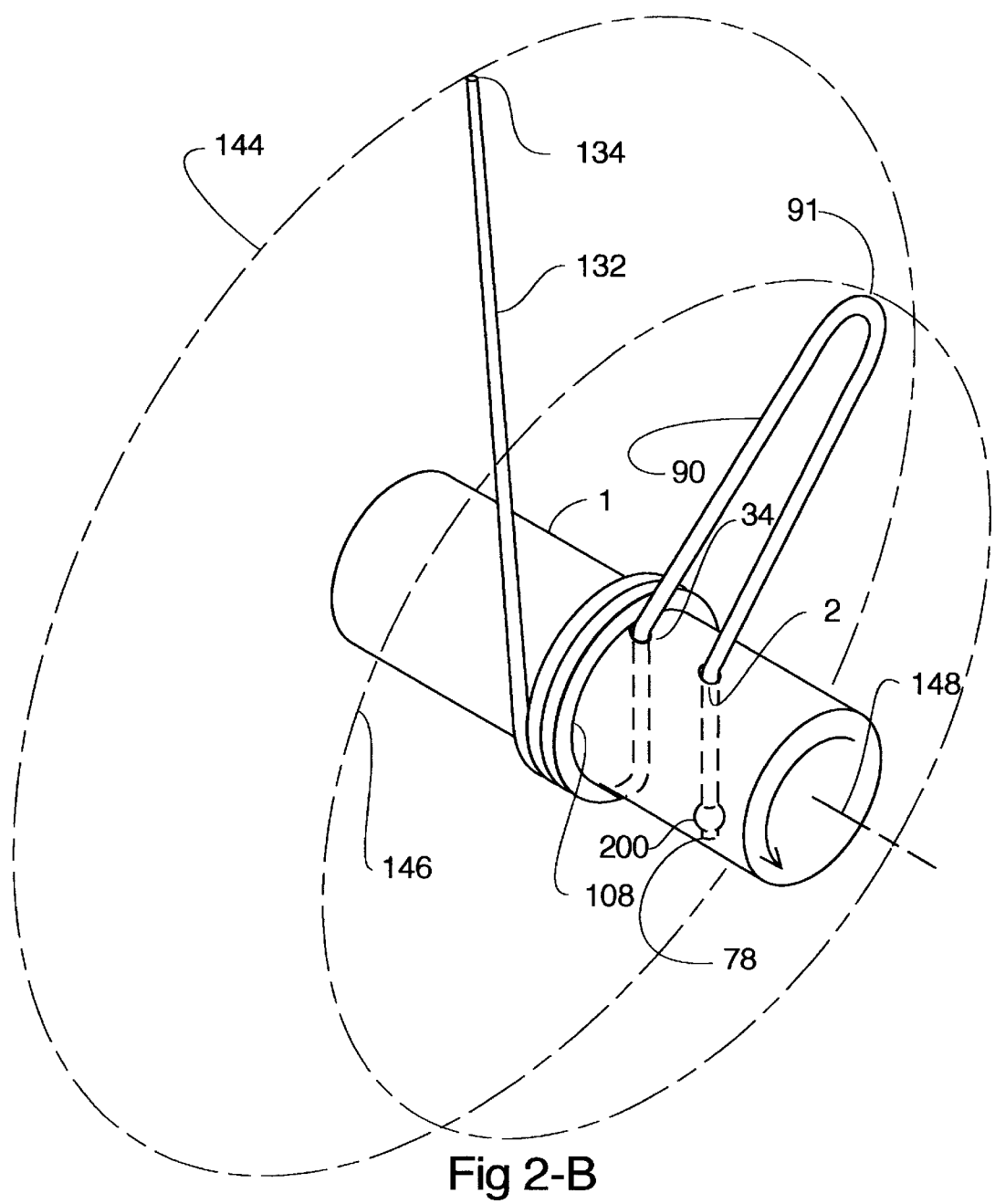
Fig 2-B

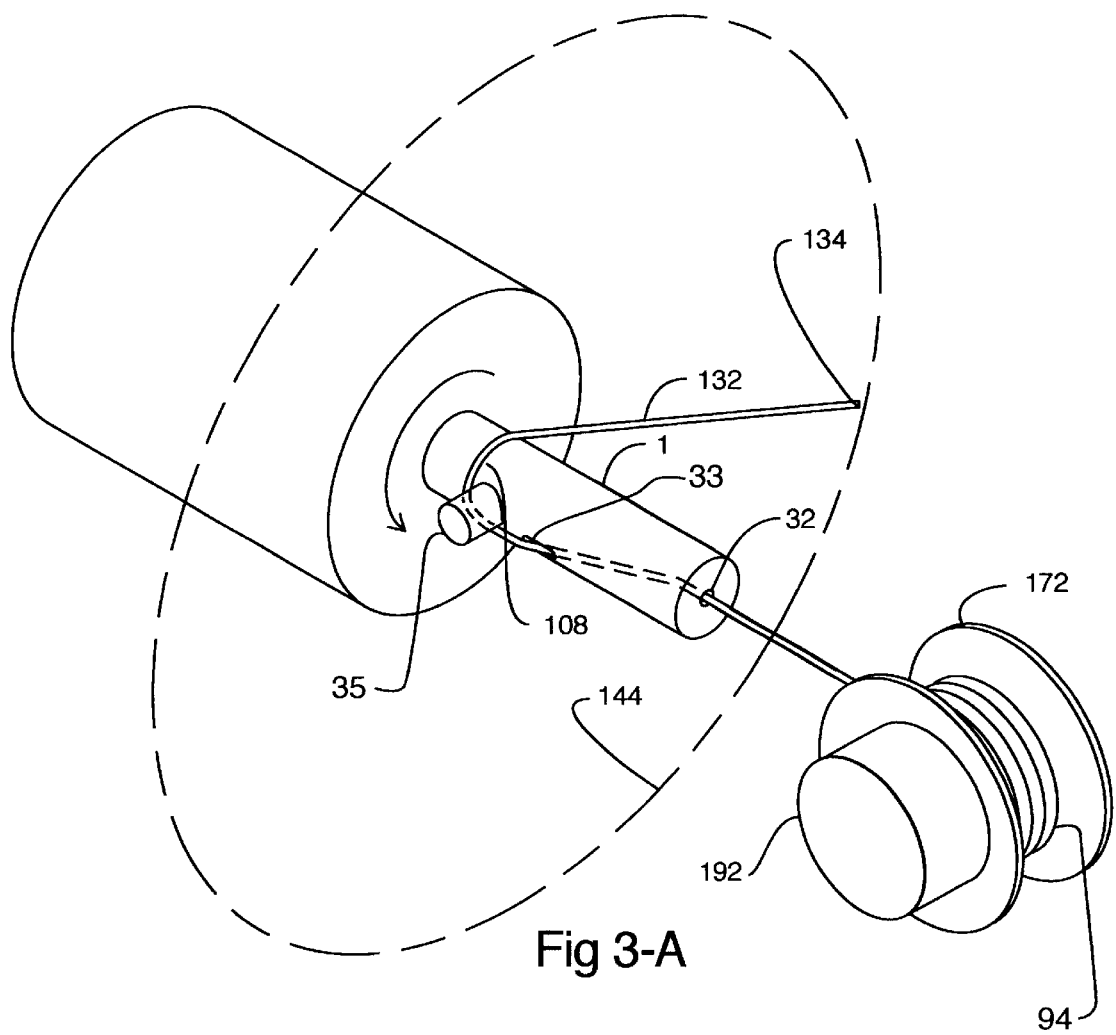
Fig 3-A

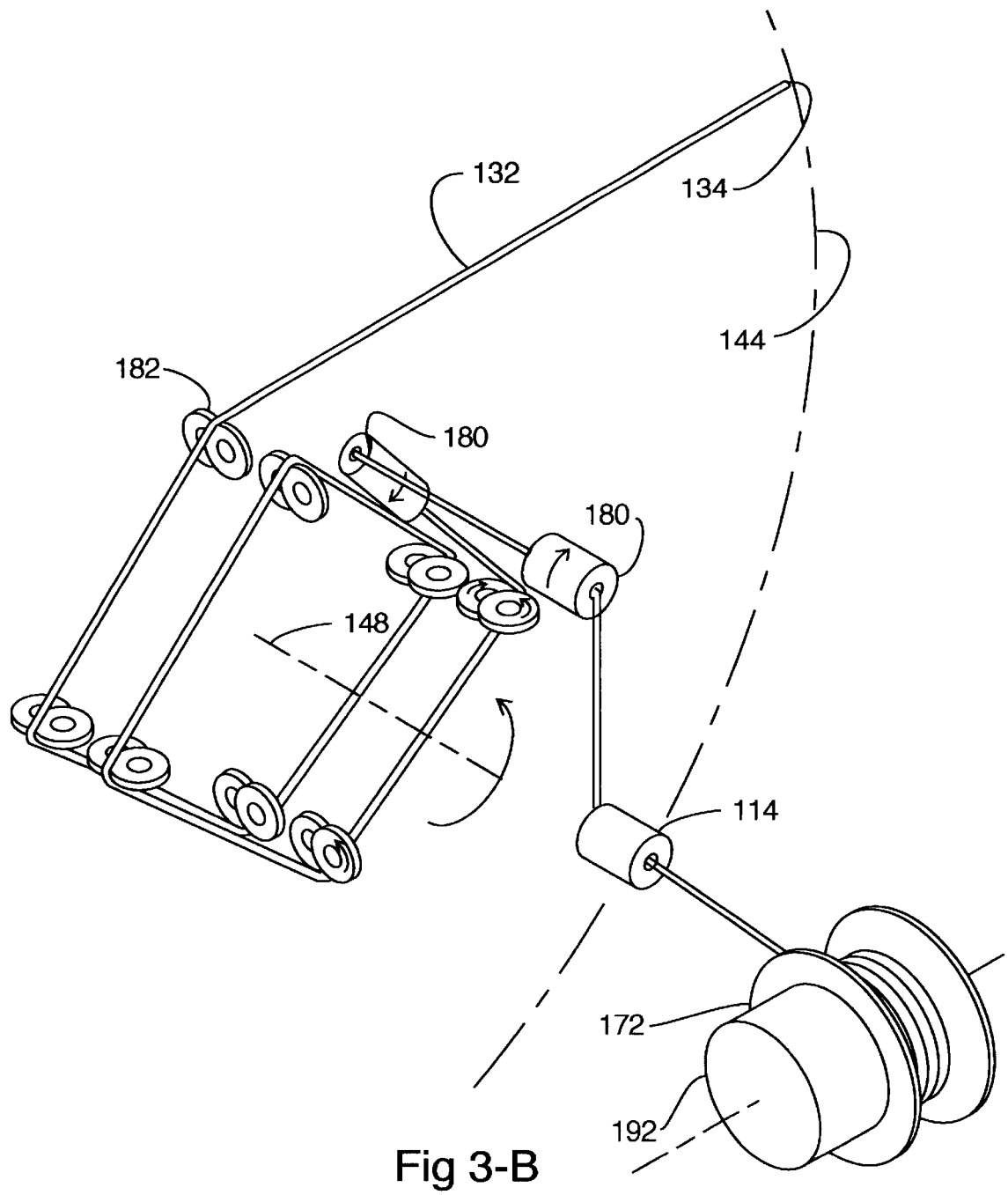
Fig 3-B

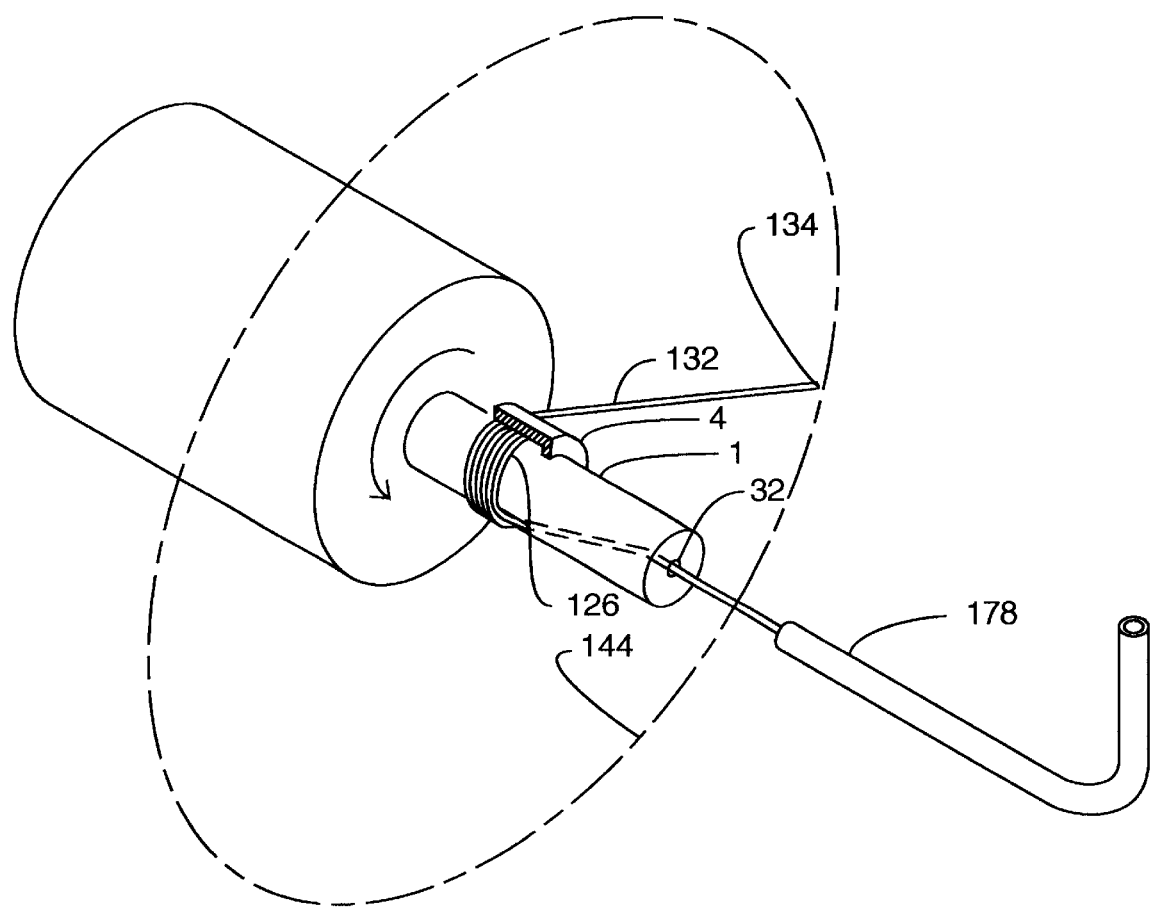
Fig 3-C

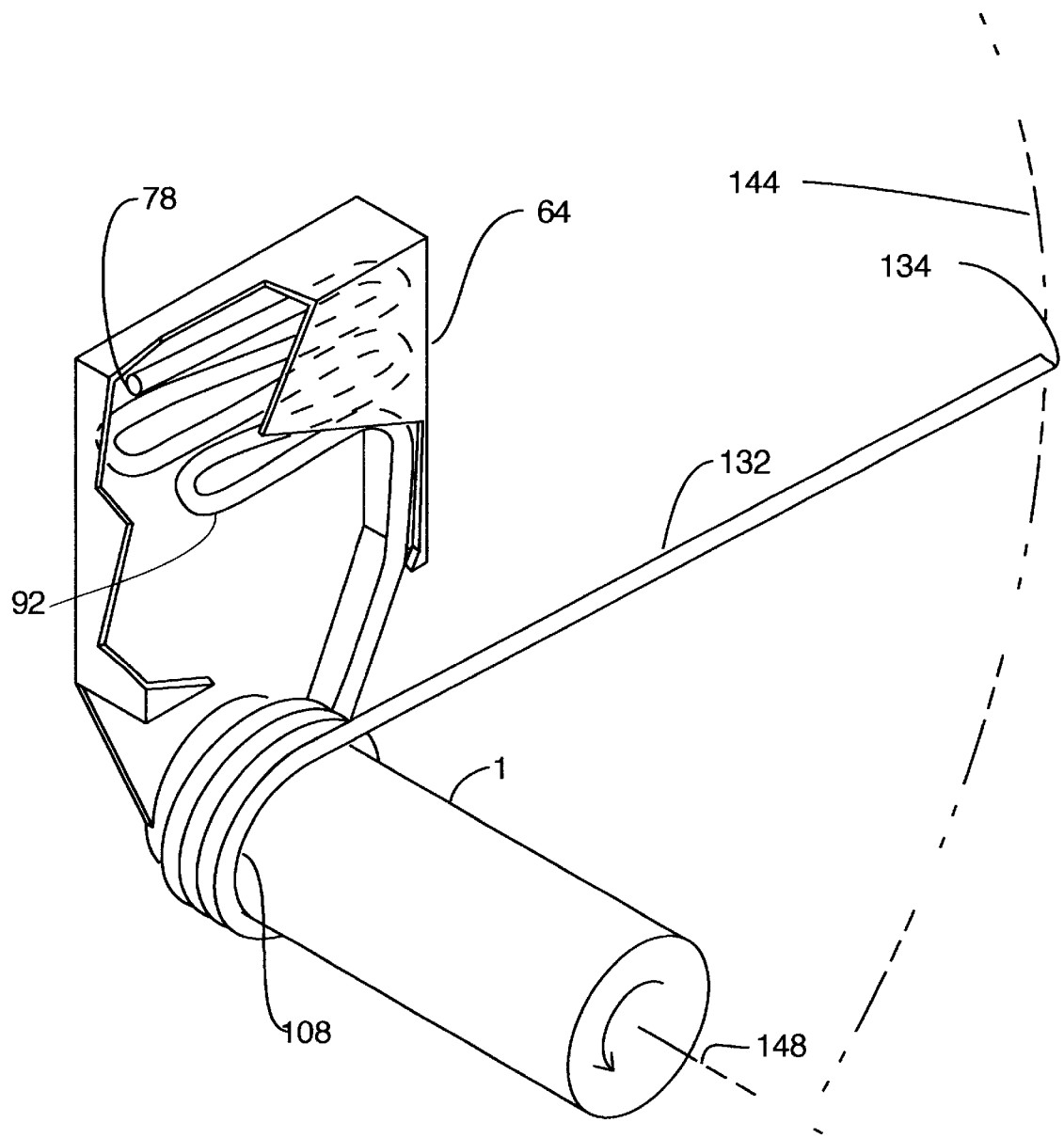
Fig 4-A

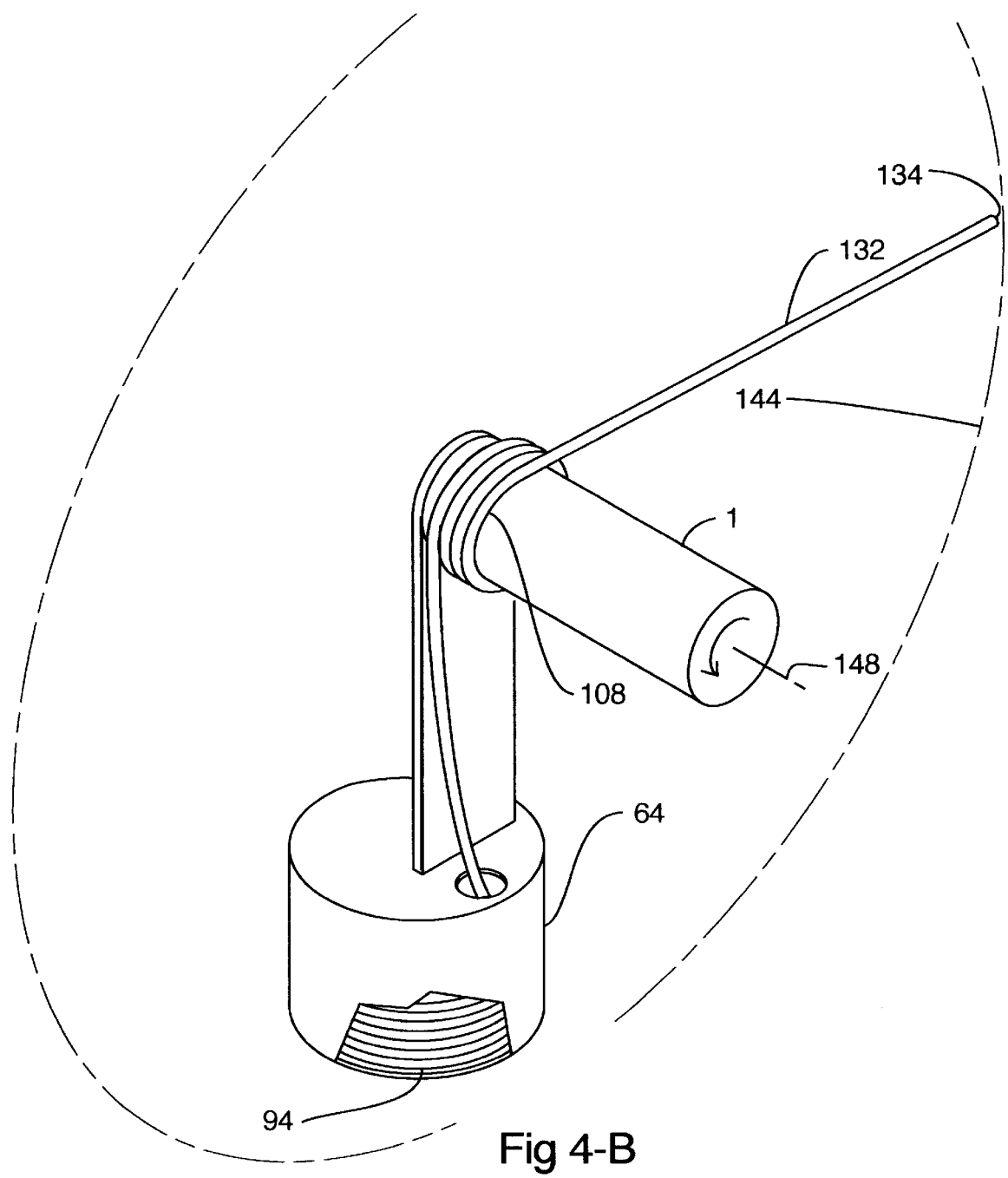
Fig 4-B

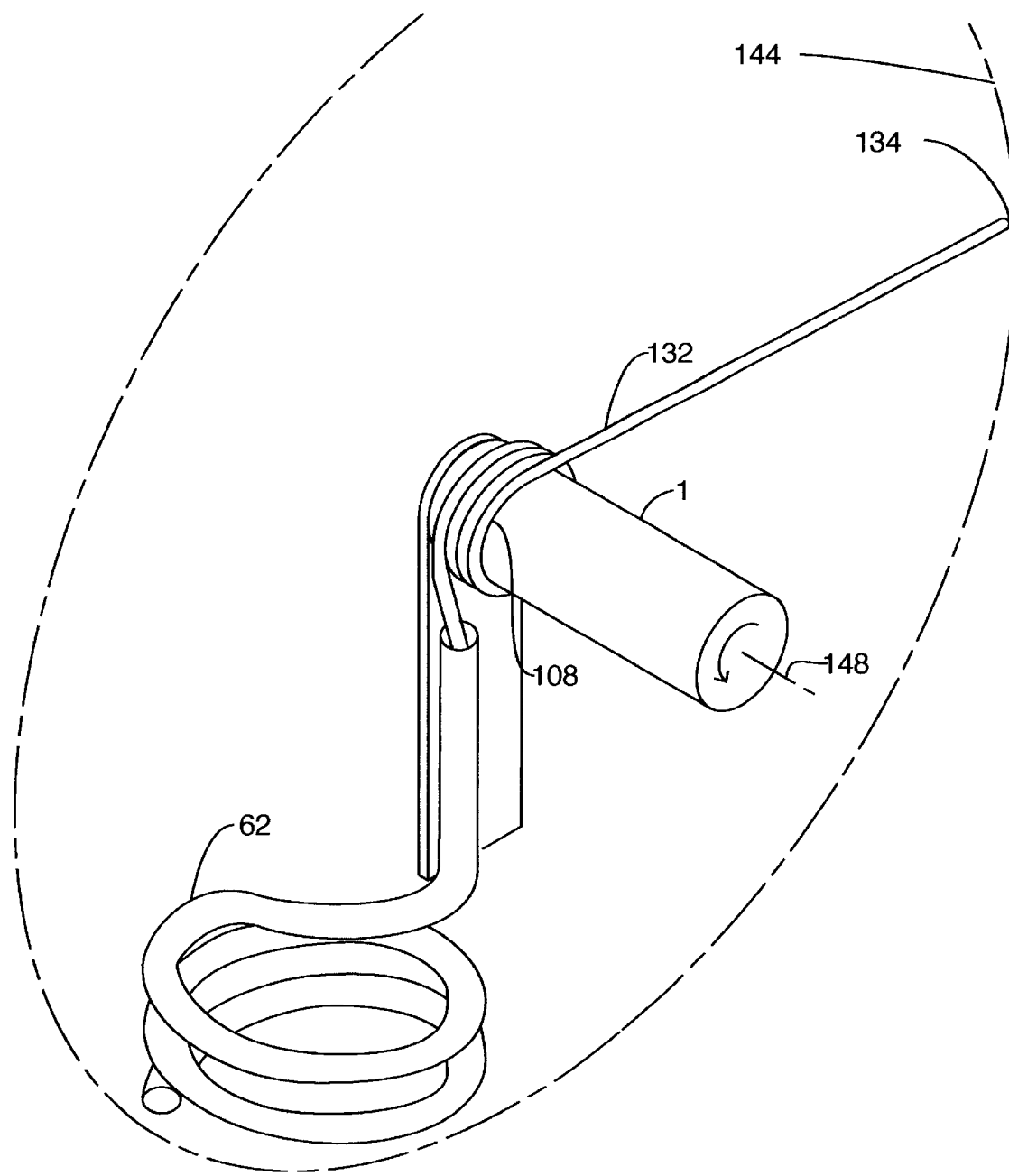
Fig 4-C

US 6,487,780 B1

ROTARY DEVICE FOR AUTOMATICALLY DEPLOYING AND RETRACTING A CORD-LIKE ELEMENT FROM A STORAGE DEVICE

The present application claims priority from U.S. Provisional Application Ser. No. 60/133,090, filed May 7, 1999 U.S. patent application Ser. No. 09/460/620 (filed on Dec. 14, 1999) and U.S. patent application Ser. No. 09/120,811 (filed on Jul. 22, 1998), each of which is hereby incorporated.

TECHNICAL FIELD

The present invention relates in general to an improved rotary dispensing mechanism, and in particular to an improved rotary mechanism for automatically dispensing and retracting a cord-like element. Still more particularly, the present invention relates to an automated rotary mechanism for dispensing and retracting a cord-like element from a reservoir thereof.

DESCRIPTION OF THE RELATED ART

Flexible line vegetation trimmers are known in the art, and are generally comprised of a long handle or rod having a cutting head at one end. The cutting head contains a spool of cutting line, similar to fishing line (polymeric monofilament), and a rotary device which causes the free end of the line to move in a circular fashion at high speed. When the cutting head is placed near overgrown vegetation, the spinning line hits the stalks or leaves and effectively cuts them away from the remainder of the plant. Flexible line vegetation trimmers have grown into a world-wide industry with annual sales exceeding a billion dollars.

One problem that has persisted with the use of flexible line trimmers (also referred to as rotary flails), is the dispensing of the cutting line from the spool. This line is typically constructed of a polymeric material that is relatively tough and durable but, after repeated use as a vegetation trimmer (or misuse on inappropriate surfaces), the line will break near the distal end, i.e., shortening the effective length of the line, and thus requiring replacement of the line, or extension of further line material from the spool.

In the prior art, there are four basic kinds of cutting heads: manual exchange; manual reel; semi-manual reel; and automatic reel. A manual exchange cutting head holds multiple lines which are not adjustable, but are instead completely removed and replaced when they get too short. The trimmer (rotary motor) must be stopped for replacement, and the stub ends are wasted. Additional material forming the mounting bracket for the lines is also discarded.

The reel types, whether manual, semi-automatic, or automatic, have a reel within a housing, and new line is delivered by releasing (rotating) this reel. With the manual reel type, the rotary motor must be stopped so the reel can be manually unlocked to extend new line. With the semi-automatic, feeding of new line is triggered by a hand lever or by bumping the cutting head on the ground. Manual and semi-automatic require the operator to monitor the line and decide when to take action. Another type of feeding device uses a mechanism which extends a length of line every time the rotary motor is slowed from a high operating speed.

The automatic reel types are equipped with a sensing device to monitor the line and activate a reel release or indexing mechanism to feed more line. A cycle of gradual decreases and sudden jumps in line length are an inherent feature because of the threshold for triggering the reel mechanism. Sudden jumps in line length cause wasted line, explaining the lack of commercial success of these types of cutting heads. Multiple independent automatic lines have been very impractical because of the complicated mechanisms involved. Today, almost all trimmers sold are equipped with bump feeds.

Reloading bump feeds is complicated and time-consuming. Casual users especially dislike the details of loading the line spool onto the cutting head. Even for those devices in which no disassembly or tools are required, it is still necessary to (i) bring the spool into loading alignment, (ii) insert the first cutting line into a loading hole, (iii) anchor the cutting line to the spool, (iv) repeat steps two and three for a second line, then (v) rotate the spool to draw the lines into the housing and wind them onto the spool. Bump feeds also have a tendency to jam. The bump button can get surrounded with mud, wet grass, or other bits of debris, and prevent proper dispensing of the line. Moreover, during feeding of a bump-type device, the head is subjected to sharp shocks which tend to jam the line in the coil and prevent smooth feeding of line. Clearing a jammed coil or bump button is time-consuming and can be further frustrating.

To date, rotary dispensing mechanism such as vegetation trimmers have only been capable of increasing the length of their consumable filament lines relative to the spool. Other than providing a sharp blade at a fixed distance from the spool for chopping off excess line, no vegetation trimmer is capable of reducing the length of the line without cutting the line and wasting the cut portion.

In addition, all vegetation trimmers dispense additional filament in such a manner that the cutting radius of the trimmer constantly varies. It has never been possible to maintain the filament at an ideal cutting length without cycling between upper and lower cutting radius bounds. This problem exists for all three types of filament feeding mechanisms (manual feed, semi-automatic feed, and automatic feed). Before additional filament is released, the cutting radius must be worn down or consumed to trigger a "release event" (e.g., the operator actuates a mechanism, or the machine deploys more line). Moreover, when a release event does occur, almost all such rotary devices release an excessive length of filament that must be wastefully cut off to a proper length before the device can be effectively used again. Furthermore, rotary devices that utilize automated filament feeders typically require elaborate mechanisms with complex moving parts that are more expensive and less reliable than their primitive counterparts.

Even relatively simple, automatic feeding mechanisms, such as the one disclosed in U.S. Pat. No. 4,569,134, require a significant reduction in the cutting radius before the mechanism will deploy additional filament. These devices typically have a spool with a pair of sidewalls that are joined at their peripheries by guide support rods. A length of filament is coiled on the spool for vegetation trimming. The free end of the filament (three free ends are shown) bends around one of the guide support rods before extending radially away from the spool. The guide support rods prevent the filament from being inadvertently released and are needed to prevent unintended release of the filament both during operation and during non-operation.

During operation, a substantial portion of the filament must be consumed before additional filament is released. Unfortunately, the cutting radius of the vegetation trimmer is concomitantly reduced, thereby reducing the effectiveness of the trimmer. only when the shortened filament approaches its supporting rod does the filament release from the rod to increase the cutting radius once again. Thus, this trimmer operates in a cycle with discrete unwinding events, triggered by a significant shortening of the extended line. The cutting radius fluctuates between upper and lower bounds, gradually decreasing, then suddenly increasing when a discrete unwinding event is triggered.

In light of the foregoing, it would be desirable to devise an improved method of dispensing cutting line in a vegetation trimmer. It would be particularly advantageous if the method utilized a cutting head that would rarely, if ever, jam nor need maintenance or adjustment, was easily reloaded without tools or requiring disassembly, and was capable of dispensing the cutting line from a reservoir.

SUMMARY OF THE INVENTION

A rotary device for automatically dispensing and retracting a line, such as cutting filament for a vegetation trimmer, has a spool around which is wound a small coil of the line. The line has a cutting segment that extends radially from the spool. The cutting segment has a precise length that is automatically maintained by a balance of centrifugal force and aerodynamic drag. The rotary device also has additional storage capacity for the line. An additional supply of line for the rotary device beyond the small coil may be stored in many different forms while remaining ready for immediate deployment and use. Examples include extended storage loops of the line protruding from the spool, a second coil or reservoir of line located remotely from the spool, or a magazine of the line mounted to the spool.

Accordingly, it is an object of the present invention to provide an improved rotary dispensing mechanism.

It is an additional object of the present invention to provide an improved rotary mechanism for automatically dispensing and retracting a cord-like element.

Still another object of the present invention is to provide an automated rotary mechanism for dispensing and retracting a cord-like element from a reservoir thereof.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1-A is an oblique view of a featureless rotatable cylindrical spool.

FIG. 1-B is an oblique view of the spool of FIG. 1-A loaded with cutting line and illustrating deployment of the cutting line.

FIG. 1-C is an oblique view of the assembly of FIG. 1-B illustrating retraction of the cutting line.

FIG. 1-D is an oblique view of a simple loop guideway.

FIG. 1-E is an oblique view of a slipknot guideway.

FIG. 2-A is an oblique view of a loaded spool showing a chord guideway and illustrating a method for forming a storage loop of cutting line by tying the trailing end of the cutting line to the spool.

FIG. 2-B is an oblique view of a loaded spool illustrating the formation of a storage loop of cutting line using an anchor hole in the spool.

FIG. 3-A is an oblique view of a spool equipped with an external storage reel.

FIG. 3-B is an oblique view of rotation sleeves and wheel sets for reducing friction resulting from axial rotation of a cutting line inside a cutting head.

FIG. 3-C is an oblique view of a loaded spool equipped with an external storage passageway for storing supplemental cutting line.

FIG. 4-A is an oblique, partial sectional view of a spool equipped with a rectangular offset magazine.

FIG. 4-B is an oblique sectional view of a spool equipped with a cylindrical offset magazine.

FIG. 4-C is an oblique sectional view of a spool equipped with an offset helical storage passageway for storing supplemental cutting line.

DETAILED DESCRIPTION OF THE PREFERRED EMBODIMENT

Figure 5:
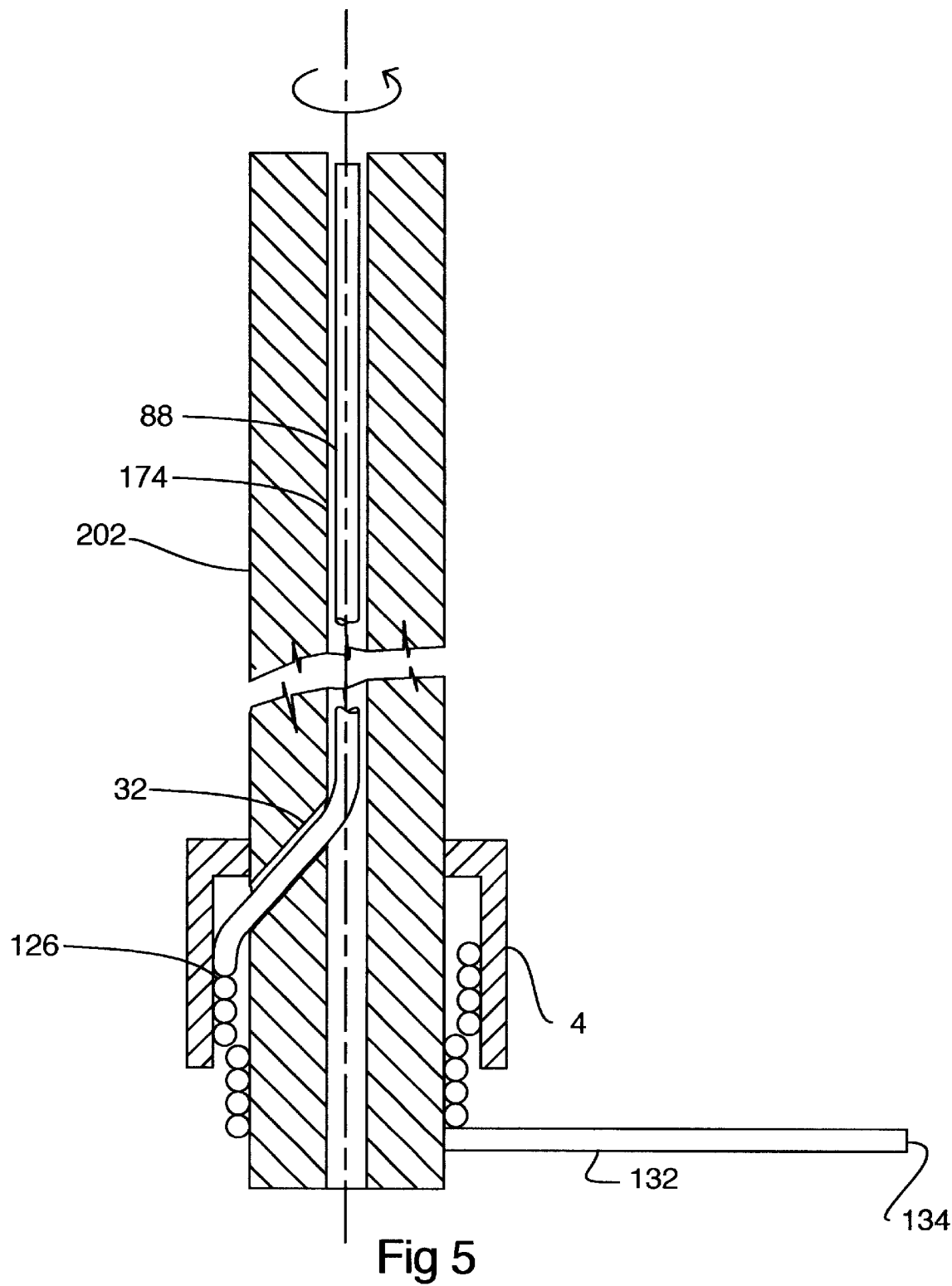
FIG. 5 is a sectional view of a spool equipped with an axial guideway to conduct the cutting line to an axial storage passageway in a hollow shaft.

FIG. 1-A illustrates an extremely simple automated rotary device, comprising only a single element, a spool (1). In FIGS. 1-B and 1-C a small coil (108) of line is wound on the spool (1) and an extended storage loop (90) of cutting line extends through an end loop guideway (36) tied at the trailing end (78) of the cutting line. The loop tip (91) traces a tip non-cutting circle (146) about the axis of rotation (148). Extended storage loop (90) may be prevented from cutting by a number ways including length control and shielding. An extended cutting segment (132) of cutting line extends tangentially from the front of the coil (108) such that the leading end (134) of the cutting line traces a cutting circle (144) about the axis of rotation (148). FIGS. 1-D and 1-E illustrate different methods of forming cutting line guideways. In FIG. 1-D, the extended storage loop (90) passes through a simple loop guideway (38). In FIG. 1-E, the extended storage loop (90) extends from a slipknot guideway (40). A plurality of extended storage loops (90) can be placed in series along the axial length of the spool (1) to increase the storage capacity.

The automatic deployment or release of cutting line is illustrated in FIG. 1-B. Initially, the coil (108) is full. As cutting line is consumed, the extended cutting segment (132) rotates clockwise, unwinding cutting line from the coil (108)

to maintain the correct length at circle (144). When the extended cutting segment (132') reaches the final position (shown in phantom), the coil (108) is nearing depletion and an automatic reloading event is on the verge of being triggered. The extended storage loop (90) remains unchanged during this cutting line release step.

The automatic retraction or rewinding of cutting line is illustrated in FIG. 1-C. The coil (108) loses its grip on the spool (1) and rotates counterclockwise, retracting the extended storage loop (90) to a shorter radius and drawing new cutting line from loop (90) into the coil (108). As the coil (108) becomes replenished and as the number of turns increases, the coil (108) regains its grip on the spool (1) and the reloading event is be automatically terminated. During this rewinding step, the extended cutting segment (132) rotates counterclockwise to position (132'), shown in phantom. The extended storage loop (90) moves to position (90'), shown in phantom, and the tip circle (146) retracts to (146').

When the extended storage loop (90) becomes too short to maintain the minimum required cutting line tension, the extended storage loop (90) slips out of the end loop guideway (36) and the entire cutting line detaches from the spool (1). If extended storage loop (90) extends beyond the cutting circle (144), excess countertension prevents retraction. In some applications, to avoid tangling, it may be useful to provide a means for holding cutting line in position when the spool is not in operation (i.e., not spinning). This may be accomplished with mechanical clips, breakaway adhesive, rubber bands, tearaway overwraps, gripping grooves, or guides. Note that if breakaway adhesive or tearaway overwraps are used, the spool may not be stopped and restarted. If mechanical clips, eyelets, or gripping grooves are used, they must be designed so as not to interfere with normal unwinding of the coil and to not interfere with delivery of the supplemental cutting line.

FIG. 2-A illustrates another simple form of the device comprising a spool (1) with a chord guideway (34).

The trailing end (78) of the cutting line is looped around spool (1) and then tied with a knot (200) to itself such that the cutting line is secured to the spool (1), forming an extended storage loop (90) that extends radially from an the spool in operation. In FIG. 2-B, the trailing end (78) extends through an additional hole or anchor hole (2) before terminating in a knot (200) on the opposite side of spool (1). The loop (90) performs the same role as described above.

FIG. 3-A illustrates a particularly useful embodiment having a practically unlimited storage capacity. This device has a storage coil (94) that is wound on an external reel (172) equipped with a reel tension control device (192) to maintain at least the minimum allowable cutting line tension. Although reel (172) is free to rotate about its axis to deploy additional cutting line, reel (172) is fixed from other movement relative to spool (1). The cutting line extends from reel (172) into an axial hole (32) in spool (1) and out of a tapered hole (33) in spool (1) near a radial pin (35) protruding from spool (1). The cutting line partially wraps around spool (1) and pin (35) before forming the cutting segment (132). If the supplemental cutting line of coil (94) is stored externally, then the cutting line (132) must twist or rotate about its own axis with respect to the external magazine, the device itself, or some combination of both.

FIG. 3-B illustrates the use of a stationary sleeve (114), rotatable sleeves (180), and wheel sets (182) to minimize the cutting line torsion required to maintain the internal rotation of cutting line within the device. Axis (148) represents the axis of rotation of the spool (not shown for clarity). The wheel sets (182) are distributed at points along a coaxial spiral path in the device. The "coil" of cutting line is formed by winding the cutting line onto the wheel sets which are free to turn to prevent twisting of the cutting line. The rotation sleeves (180) and wheel sets (182) reduce frictional resistance to axial rotation of the cutting line while offering normal frictional resistance to axial sliding of the cutting line. The wheel sets (182) allow the coil to wind and unwind normally. In FIG. 3-B, the device itself is omitted to better illustrate the locations of the rotation sleeves (180) and wheel sets (182). From the external reel (172), the cutting line passes through the stationary external axial guideway (114), then turns a right angle to pass radially outward to the entrance of a first rotation sleeve (180). A second rotation sleeve (180) is orthogonal to the first and feeds the cutting line into the wheel sets (182). This combination of a stationary external axial guideway (114) with radially positioned rotation sleeves (180) facilitates the rotation of the cutting line about its axis within the cutting head.

FIG. 3-C illustrates the use of an stationary external passageway (178) for storing the supplemental cutting line. The cutting line rotates within the external passageway as it is fed into an axial hole (32) in the spool (1). The cutting line exits a tapered hole in the spool and makes several wraps around the spool. Because this arrangement does not supply countertension to keep a conventional coil snugly wrapped, a concave-convex spool (4) (shown cut away) and a concave-convex coil (126) are used. Spool (4) has a concave or cylindrical inner surface that captures coil (126) against the convex outer surface of the main spool (1). The cutting segment (132) extends from spool (4) to a cutting tip (134) to define a cutting circle (144).

FIG. 4-A illustrates a rectangular offset magazine (64) with a storage bundle (92) of cutting line having a proximal end (78). The cutting line is fed from magazine (64) onto spool (1) where several wraps (108) are made 25 before cutting segment (132) protrudes therefrom. Magazine (64) rotates with spool (1) and is properly counterweighted as is known in the art. The embodiment of FIG. 4-B is similar but has a cylindrical offset magazine (64) with a storage coil (94). FIG. 4-C illustrates an offset helical storage passageway (62) having a plurality of storage coils containing cutting line. Each of these geometries are easy to load and have high storage capacity.

FIG. 5 illustrates the use of a tapered guideway (32) in the spool (202) which conducts the cutting line from an axial storage passageway (174) containing an axial storage segment (88). This design also requires a concave-convex spool (4) to prevent anomalous unwinding of the coil (126) of cutting line into cutting segment (132). As alluded to in FIG. 3-C, a portion of coil (126) is tightly wrapped around the convex or cylindrical outer surface of spool (202) while the other portion of coil (126) engages the concave or cylindrical inner surface of spool (4) before entering guideway (32) and passageway (174). This embodiment allows utilization of otherwise unused space.

Figure 6:
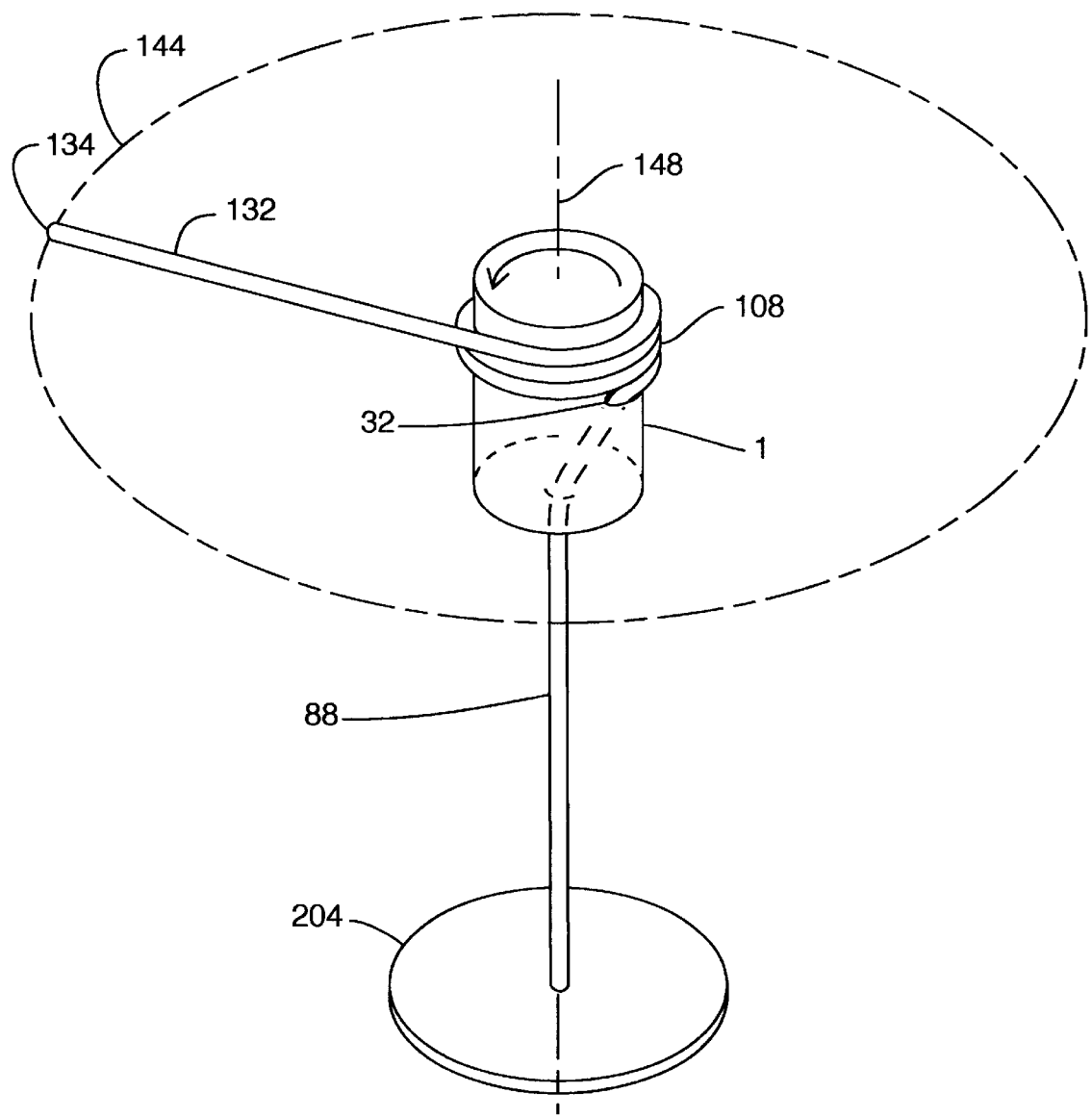
FIG. 6 is an oblique view of a vertically-mounted spool equipped with an axial guideway to conduct the cutting line to the axis of rotation, and equipped with a pendulous weight attached to the trailing end of the cutting line.

FIG. 6 illustrates a vertically-mounted device having a spool (1) with a tapered guideway (32) which conducts the cutting line along the axis of rotation (148). The axial storage segment (88) hangs downward and is attached to a hanging weight (204). The weight (204) is suspended below the device, supported by the cutting line. With each automatic reloading event, the weight (204) moves upward as cutting line is drawn into the coil on the spool (1), giving a visual indication of cutting line consumption. The weight (204) must be heavy enough keep the coil (108) wound securely on the spool (1), but not so heavy as to prevent lifting.

Figure 7:
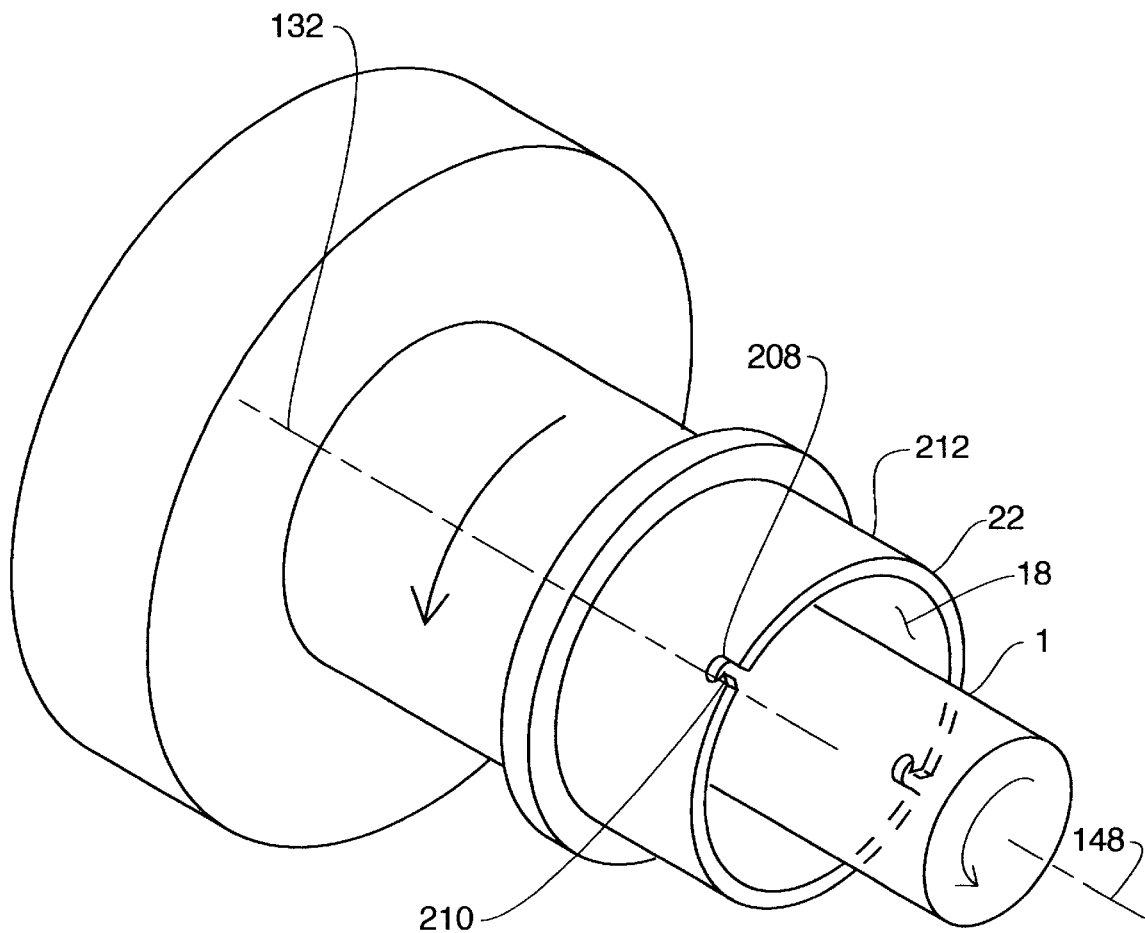
FIG. 7 is an oblique view of an alternate embodiment of a spool equipped with an improved cutting line exit rotor.

FIG. 7 illustrates a device that is based upon U.S. Pat. Nos. 5,675,897, and 5,743,019 (to Berfield), which are incorporated herein by reference. The present device of FIG. 7 is equipped with an improved cutting line exit rotor (212). The purpose of a cutting line exit rotor (212) is to reduce friction between the extended cutting segment of the cutting line and the front annular lip (22) of the annular channel (18) where the cutting line makes a right-angle bend. The cutting line exit rotor (212) is equipped with retaining holes (208) to assure that the extended segments of the cutting line are uniformly distributed around the axis of rotation (148). In the prior art exit rotor, disassembly is necessary to reload and it is necessary to thread each strand of cutting line into a retaining hole in the exit rotor. In the improved version of FIG. 7, the annular channel (18) is open, so cutting line can be loaded without disassembly by sliding coils of cutting line sideways into the annular channel (18). Each retaining hole (208) is equipped with an insertion notch (210) so that a strand of cutting line can be inserted into and retained within the retaining hole (208) by pushing the strand of cutting line sideways through the insertion notch (210). Alternatively, the strands of cutting line automatically insert themselves into the retaining holes when the device is started.

Figure 9:
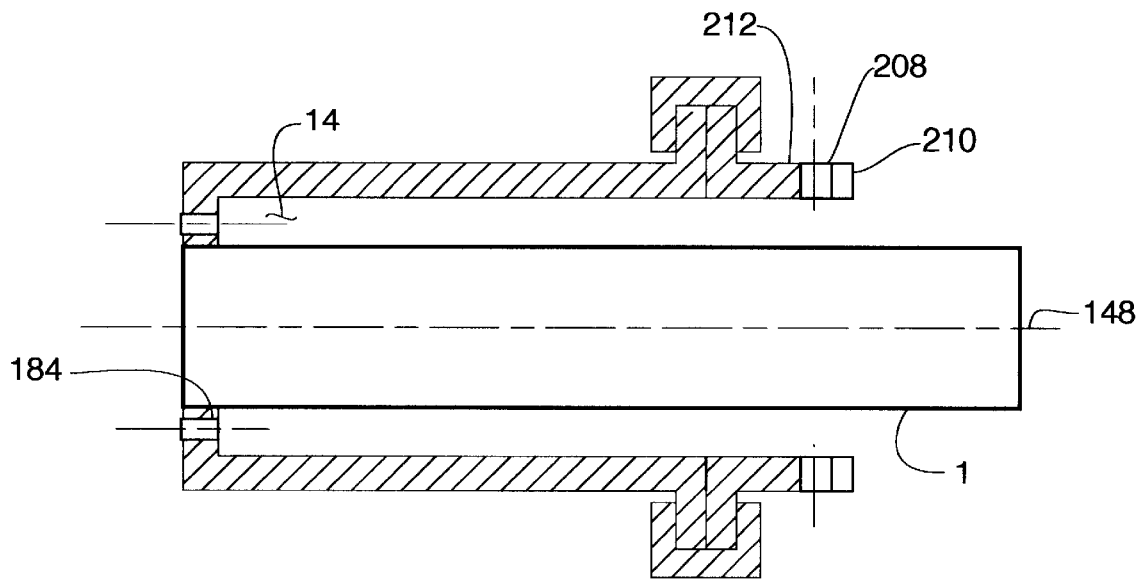
FIG. 9 is a sectional view of a spool equipped with an annular storage cavity and an improved cutting line exit rotor.

FIG. 9 illustrates a similar device equipped with an annular cavity (14), back loading holes (184), and an exit rotor (212) with retaining holes (208) and insertion notches (210). The advantages of this design are fully automatic operation, reliability, ample storage capacity, simplicity, low cost, light weight, and ease and speed of loading. The annular storage cavity (14) retains the coil of cutting line therein so that the cutting line does not become tangled when the trimmer is in storage or when it is stopped and restarted. Alternatively, a double-length segment of cutting line can be folded over into a loop so that each of the two ends is a leading end. Each of the two leading ends of the loop is inserted into a back loading hole (184).

Figure 8:
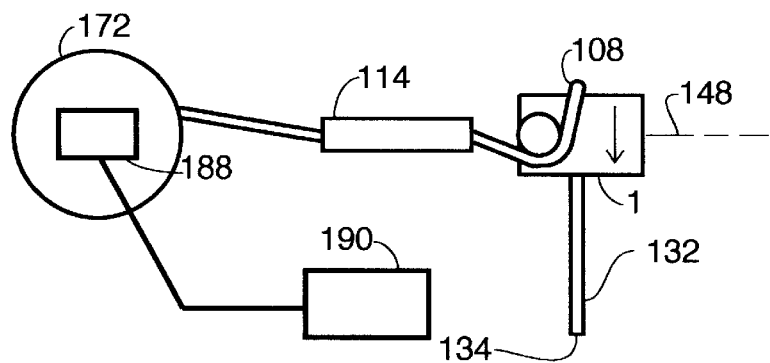
FIG. 8 is a schematic illustration of a spool equipped with an external reel, a reel indexing mechanism, and a reel indexing control system.

FIG. 8 illustrates a device with an external storage reel (172), a stationary external axial guideway (114), a reel indexing mechanism (188), and a reel indexing control system (190). Each time the reel indexing mechanism (188) is activated by the reel indexing control system (190), the external reel (172) rotates through a fixed angle to deliver a fixed length of cutting line to the spool (1). This arrangement minimizes the length of cutting line in the coil (108), thereby it minimizes friction between the spool (1) and the cutting line, and the friction generated by rotation of the cutting line about the cutting line axis which is a consequence of the external reel (172). In this arrangement, the length of the extended cutting segment (132) is precisely and continuously controlled by the automatic deployment effect. Periodic refilling of the coil is accomplished with a simple, reliable, and inexpensive indexing mechanism controlled by a simple, reliable and inexpensive control system.

In operation, centrifugal force acts to expand the individual turns of the coil of cutting line on the spool. Tension tends to contact the individual turns of the coil. If the coil is wound on the convex, cylindrical outer surface of the main spool (1) and the tension in the coil falls below the threshold value, the coil tends to unwind (backwards) from the main spool. If the coil is wound on the concave, cylindrical inner surface of the outer spool (4) (FIGS. 3-C and 5) and the tension exceeds the threshold value, the coil will contract, losing contact with the concave cylindrical winding surface of the outer spool.

A device in which the supplemental cutting line is an extended storage segment or extended storage loop, see FIG. 1-B and 2-A, has two restrictions on the radial extension of the loop or segment of supplemental cutting line. First, if the supplemental cutting line extends beyond the cutting circle, the supplemental cutting line will not feed. Second, each time supplemental cutting line is drawn into the coil, the radial extension decreases, and so the tension at the back of the coil decreases. When the tension decreases below the threshold value, the entire segment or loop is suddenly drawn into the coil. If loops are in series, the subsequent extraction of cutting line is taken from the next loop in the series. When the extension of the last storage loop falls below the threshold, the remaining cutting line detaches from the spool, unless there is a provision for securing the trailing end as in FIG. 2-A. Also, in FIG. 2-A, friction in the chord guideway can delay the onset of sudden loop retraction.

In the embodiment of FIG. 3-A, the reel tension control (192) device assures that the coil tension does not fall below a threshold value. The embodiments of FIGS. 3-C and 5 illustrate the use of an additional spool (4) on the main spool. The front portion of the coil (126) (where tension is high) is wound on the convex outer surface of the main spool. The back portion of the coil (126) (where tension is low) is wound on the concave inner surface of spool (4). The devices of FIGS. 3-C and 5 are characterized by this low tension at the back of the coil (126). In FIG. 6, note that an important purpose of the pendulous weight (204) is to stabilize the coil (i.e., to keep the coil wound snugly around the spool). Note also that the offset magazine (64) of FIGS. 4-A and 4-B, must be positioned sufficiently far from the axis of rotation (148) to assure the stability of the coil (108), iibut not so far as to prevent extraction of supplemental cutting line contained therein.

Any practical cutting head must be properly balanced with respect to the axis of rotation. No attempt has been made in this discussion to illustrate balanced cutting heads. Methods of balancing spinning devices are well-known to those skilled in the art. The apparently unbalanced cutting heads illustrated here can be balanced with counterweights or by using multiple cutting lines distributed in a balanced arrangement about the axis of rotation. Alternatively, the single cutting line described above may be replaced by a double cutting line.

While the invention has been shown or described in only some of its forms, it should be apparent to those skilled in the art that it is not so limited, but is susceptible to various changes without departing from the scope of the invention.

What is claimed is:

1. A dispenser with fully automated length control, comprising:

a spool adapted to be mounted to a rotary drive element for rotation therewith;

a sleeve surrounding the spool and stationary relative thereto;

an exit rotor rotatably mounted to the sleeve and having a retaining hole with an insertion notch therein;

a coil of consumable filament wound on the spool and having an extended portion that extends through the retaining hole in the exit rotor, wherein, the extended portion is substantially tangent to the spool during rotation, the extended portion having a length with a free end that defines a circular swath having a swath radius measured from the spool to the free end, wherein the extended portion maintains a linear orientation from the spool to the free end prior to contact with a target; and wherein as the extended portion of the filament is consumed during rotation due to contact with the target such that the length of the extended portion is reduced to less than the swath radius, additional filament is automatically dispensed from the spool by centrifugal force until aerodynamic drag acting on the extended portion counterbalances the centrifugal force.

2. The dispenser of claim 1 wherein the coil is replenished by inserting filament through the insertion notch.

* * * * *